United States Patent [19]

Lucking et al.

[11] Patent Number: 5,436,695
[45] Date of Patent: Jul. 25, 1995

[54] METHOD AND APPARATUS FOR LOADING THIN FILM MEDIA

[75] Inventors: Lawrence M. Lucking, Hugo; Thomas J. Staiger, Hastings, both of Minn.

[73] Assignee: Minnesota Mining and Manufacturing, St. Paul, Minn.

[21] Appl. No.: 210,153

[22] Filed: Mar. 17, 1994

[51] Int. Cl.⁶ ............................................. G03B 27/20
[52] U.S. Cl. ........................................ 355/76; 355/47; 346/138; 347/264
[58] Field of Search .................. 355/47, 73, 76; 346/138; 347/264

[56] References Cited

U.S. PATENT DOCUMENTS

| | | |
|---|---|---|
| 4,270,859 | 6/1981 | Galbraith et al. . |
| 4,465,357 | 8/1984 | Mugrauer et al. . |
| 4,595,957 | 6/1986 | Holthusen . |
| 4,669,870 | 6/1987 | Fosh ........................... 355/76 X |
| 4,833,487 | 5/1989 | Koyanagi et al. . |
| 5,049,900 | 9/1991 | Bidner et al. . |
| 5,097,351 | 3/1992 | Kramer ........................ 359/17 |
| 5,151,713 | 9/1992 | Kawasaki et al. . |
| 5,172,905 | 12/1992 | Vanous et al. . |
| 5,192,067 | 3/1993 | Saito . |
| 5,207,414 | 5/1993 | Schimanski et al. . |
| 5,210,616 | 5/1993 | Kawasaki et al. . |
| 5,211,391 | 5/1993 | Kerr et al. ..................... 346/138 X |

FOREIGN PATENT DOCUMENTS

| | | |
|---|---|---|
| 359483 | of 0000 | European Pat. Off. . |
| 528441 | of 0000 | European Pat. Off. . |
| 551772 | of 0000 | European Pat. Off. . |
| 3715119 | of 0000 | Germany . |
| 4225403 | of 0000 | Germany . |
| 4239621 | of 0000 | Germany . |

*Primary Examiner*—Michael L. Gellner
*Assistant Examiner*—D. P. Malley
*Attorney, Agent, or Firm*—Merchant, Gould, Smith, Edell, Welter & Schmidt

[57] ABSTRACT

A thin flexible film is loaded into an interior surface of a hollow image-processing drum by releasably adhering a sheet of the film to a carrier. The carrier is admitted into the drum and positioned in spaced relation to the interior surface of the drum. The upper surface of the carrier is urged to the surface of the drum to place the sheet in residence against the interior surface of the drum. The sheet of film is releasably adhered to the drum and the carrier is removed from the drum. A receptor sheet may be placed within the drum and a donor sheet placed over it in a similar manner.

24 Claims, 14 Drawing Sheets

METHOD AND APPARATUS FOR LOADING THIN FILM MEDIA

BACKGROUND OF THE INVENTION

1. Field of the Invention

This invention pertains to loading donor or receptor sheets of transfer-imaging material. More particularly, this invention pertains to a method and apparatus for loading a thin flexible film onto an interior surface of an image-processing drum.

2. Description of the Prior Art

In the prior art, it is well known to write onto a film using a laser-imaging system. Such systems include placing a film of material against an inner surface of a generally cylindrical drum. Commonly, such drums have an access opening extending axially along one side of the drum. The axial opening covers about ninety degrees of the cylindrical geometry of the drum such that the drum provides a surface for image exposure over a 270° arc. With such systems, a film would be placed against the internal surface of the drum and held in place by means of a vacuum applied across the drum. To accommodate the vacuum adherence, the drum would be perforated so that a vacuum could be applied to the external surface of the drum with the perforations permitting application of the vacuum to the internal surface of the drum. With the material in place, the film would be scanned with a laser down the center of the drum.

In prior art internal drum laser-imaging systems, films utilized would be relatively thick (for example, about 4 to 6 mils in thickness). A leading edge of the film would be pushed into the drum. The film would assume the internal shape of the drum. After insertion of the film into the drum, the vacuum would be applied to draw the film against the internal surface of the drum.

It is desirable to use thin films with internal drum laser-imaging systems. Thin films present a lower cost of materials for use in the imaging system. Thin films typically are coated polyester material and range in thickness from about 0.25 mils to 2 mils.

The use of thin films within internal drum laser-imaging systems presents serious problems when loading the film. The thin films are extremely flimsy and present a high chance for formation of wrinkles or scratches on the film as it is being placed on the inside surface of the drum. Placement of the film is further complicated due to the need of placing the film against the inner surface of the drum without interfering with laser optics or a scanning-beam transport extending axially within the drum.

SUMMARY OF THE INVENTION

According to a preferred embodiment of the present invention, a method for loading a thin flexible film onto an interior surface of a hollow image-processing drum is provided. A sheet of the film is placed on a top surface of a carrier. The sheet is releasably adhered to the top surface. The carrier and the adhered sheet of film are admitted into the drum and positioned with the sheet of film opposing and spaced from the drum interior surface. The top surface of the carrier is urged toward the interior surface of the drum causing the sheet of film to be placed in residence against the interior surface. The sheet of film is releasably adhered onto the interior surface. Following adherence of the sheet of film onto the interior surface, the carrier is removed from the drum leaving the sheet of film on the drum interior surface.

In addition to the foregoing, we have found that thin films can be placed in multiple layers on the internal surface of the drum. For example, when loading films for use in image transfer, the first sheet loaded into the drum can be semi-air permeable. The sheet is releasably adhered to the interior surface of the drum by a vacuum. Due to the semi-air permeability of the sheet, the vacuum passes through tile sheet to hold a second sheet in place in overlying relation on the first sheet. Alternatively, if the first sheet is not air permeable, the vacuum of the drum can be applied over a surface area greater than the surface area of the first sheet. The second sheet can have a surface area greater than the surface area of the first sheet. Accordingly, the second sheet is held against the first sheet by reason of a vacuum applied around the periphery of the first sheet. Also, if the peripheral area of the vacuum surrounding the first sheet is a separately operable zone, the peripheral area can be pressurized in order to blow the second sheet off of the first sheet while maintaining a vacuum on the first sheet to hold it in place.

DESCRIPTION OF THE PREFERRED EMBODIMENT

Figure 1:
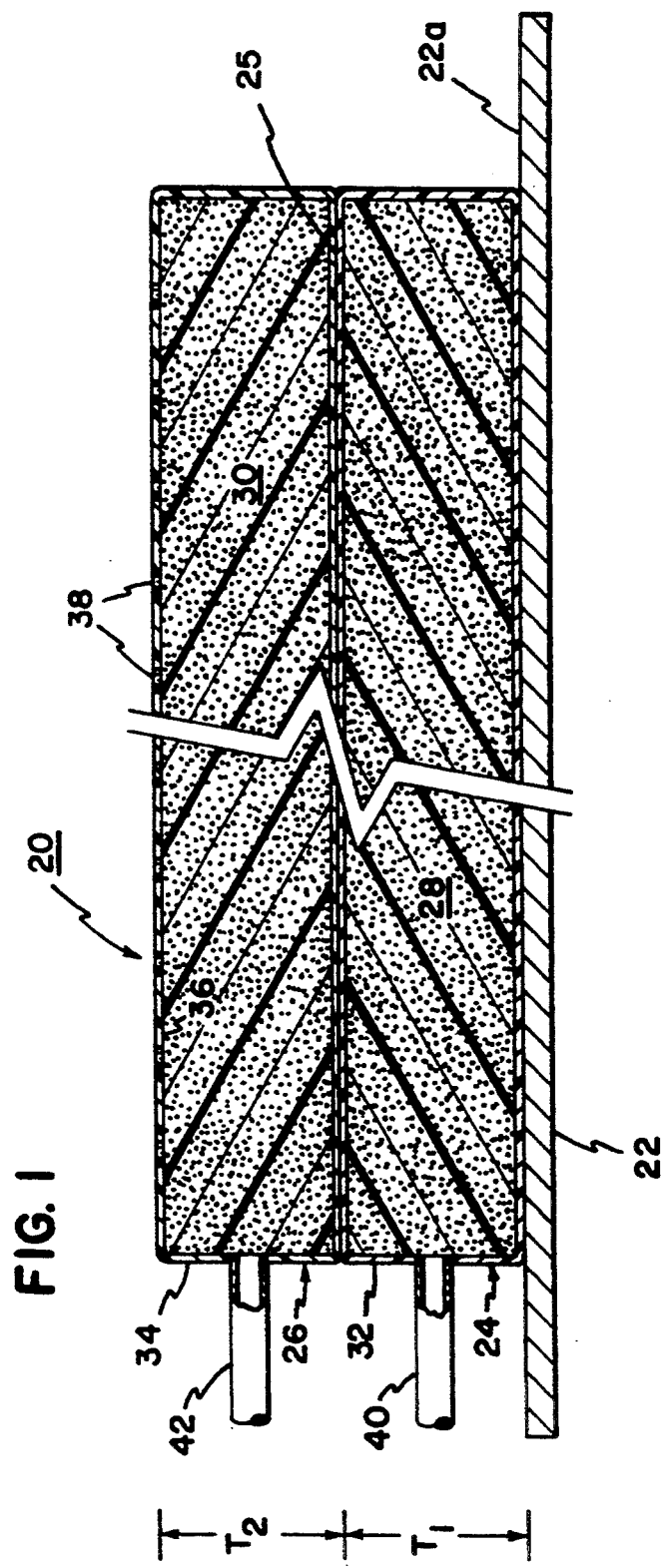
FIG. 1 is a side sectional view showing one embodiment of a carrier according to the present invention.

Referring now to the several drawing figures in which identical elements are numbered identically throughout, a description of the preferred embodiment of the present invention will now be provided.

The present invention utilizes a carrier for placing a thin flexible film onto an interior surface of a hollow imaging-processing drum 10. Such drums are well known in the art. Shown, for example, in FIG. 2, the drums 10 are hollow cylinders having an internal surface 12 accessible through an access opening 14. Commonly, the access opening 14 covers an arc of about ninety degrees and extends along the axial length of the drum 10. As a result, the internal surface 12 covers an arcuate surface of about 270°. Not shown for purposes of clarity, laser optics material is typically provided extending axially within the drum and supported through opening 14.

For image-transferring operations, a film is placed against the interior surface 12. To hold the film in place, the drum wall is provided with perforations 16 (shown greatly exaggerated in size in FIGS. 2–9 and omitted for purpose of clarity from FIGS. 12–15). A vacuum (indicated by arrows A) is applied to the external surface 13 of the drum with the perforations 16 permitting the vacuum to operate on the internal surface 12 to hold a film against the internal surface 12.

As will be more fully described, some of the films used in image processing are at least partially air permeable. Accordingly, several layers of film can be held simultaneously against the internal surface 12 by means of application of a vacuum to the external surface 13 of the drum 10.

In the prior art, a thick film (4 to 6 mils in thickness) could be placed within the drum simply by forcing a sheet of the film through the access opening 14. The flexibility of the sheet would permit it to assume the shape of the internal surface 12 and the vacuum applied to the external surface 13 would hold the film in place. However, thin films (0.25 to 2 mils in thickness) cannot be placed into the drum 10 simply by passing a leading edge of the sheet of film into the drum 10. Such thin films are extremely flimsy and prone to development of surface wrinkles.

For placing such thin films into a drum 10, a carrier 20 is provided. In the embodiment of FIGS. 1–9, the carrier 20 includes a semi-rigid backing sheet 22. Backing sheet 22 may simply be a sheet of aluminum having a surface area approximately equal to a surface area of internal surface 12. The sheet 22 is sufficiently flexible such that upon insertion into the drum, it can flex to assume a generally cylindrical shape such that it can oppose the internal surface 12 and substantially cover the surface 12. In a rest state, sheet 22 is flat.

Secured to a top surface 22a of backing sheet 22 is a first or bottom bladder layer 24. Also, secured to the top surface 25 of the first bladder layer 24 is a second bladder layer 26. In the embodiment of FIGS. 1–9, each of the bladder layers 24, 26 is substantially identical (except for perforations 38 as will be described) and includes a resilient foam sheet 28, 30 completely surrounded by an air impervious coating or envelope 32, 34. Preferably, the foam sheets 28, 30 are open-cell foam for purposes that will be apparent.

The upper bladder 26 presents a top surface 36. The top surface 36 of the upper envelope 34 is provided with perforations 38 extending through the top surface 36.

Air tubes 40, 42 are provided to each of the bladders 24, 26, respectively, with the tubes 40, 42 extending through the envelopes 32, 34, respectively, and into the interior of the bladders 24, 26. As a result, a vacuum applied to tube 40 results in air being drawn out of bladder 24. Similarly, a vacuum applied to tube 42 results in air being drawn out of bladder 26. Venting of tubes 40, 42 permits air to flow back into the bladders 24, 26, respectively. The open-cell foam sheets 28, 30 ensure that the vacuum applied to tubes 40, 42 is experienced throughout the interior of the bladders 24, 26.

It will be appreciated that application of a vacuum to tube 40 causes the thickness $T_1$ of bladder 24 to narrow or reduce. Upon release of the vacuum on tube 40, the resilience of the internal foam 28 causes the bladder 24 to assume its rest thickness $T_1$.

Due to perforations 38, application of a vacuum to tube 42 does not result in reduction of the rest thickness $T_2$ of bladder 26 absent a sheet of material being placed atop surface 36 and covering perforations 38. The presence of such a sheet of material causes the thickness $T_2$ to be reduced upon application of a vacuum to tube 42.

With the construction of the carrier 20 just described, the method of the present invention can best be appreciated with reference to FIGS. 2 through 9 in which the sequence of loading a thin film 50 onto the interior surface 12 of the drum 10 is shown in sequential schematic views.

Figure 2:
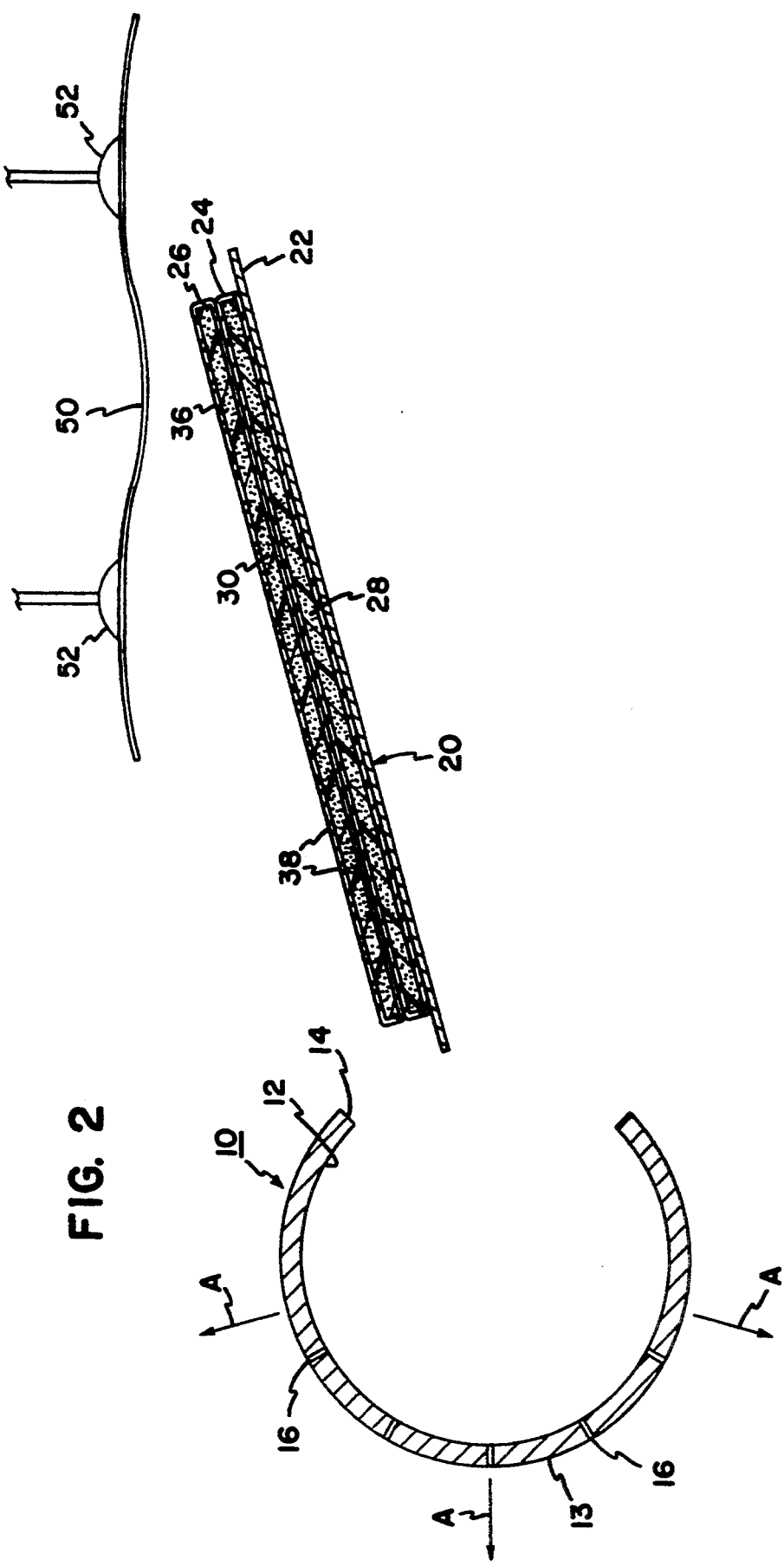
FIG. 2 is a side elevation schematic view showing the carrier of FIG. 1 about to receive a thin film for placement within an image-processing drum.

With reference to FIG. 2, the carrier 20 is shown with each of bladders 24, 26 in their rest states (i.e., without vacuums applied to either of tubes 40, 42, which are not shown in FIGS. 2–9 for purpose of clarity). A sheet of thin flexible film 50 is placed onto the upper surface 36 by means of pick-and-place suction transports 52 or any other suitable transport. The thin sheet 50 may come from a source (not shown) of pre-cut sheets of thin film or may be continuously cut from a roll of such film.

Figure 3:
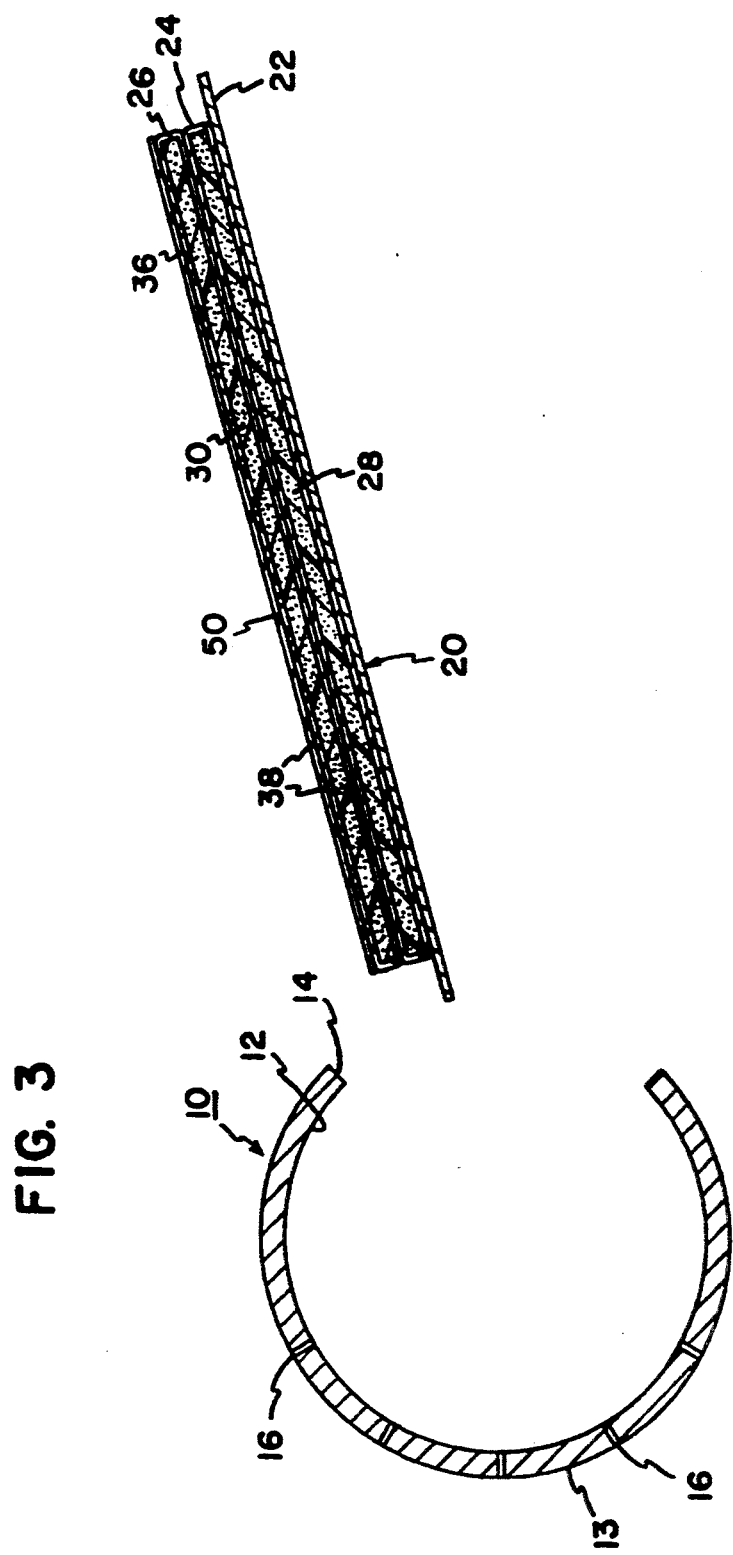
FIG. 3 is the view of FIG. 2 showing the film in placement on the carrier.

In FIG. 3, the sheet 50 is shown in position in overlying relation to the top surface of upper bladder 26. With the sheet 50 in place on top of the carrier 20 as shown in FIG. 3, a vacuum is applied to tube 42. Since sheet 50 covers perforations 38, application of the vacuum to tube 42 causes upper bladder 26 to collapse in thickness as well as releasably adhere the sheet 50 to surface 36 (see FIG. 4 showing carrier 20 with top bladder 26 collapsed).

Figure 4:
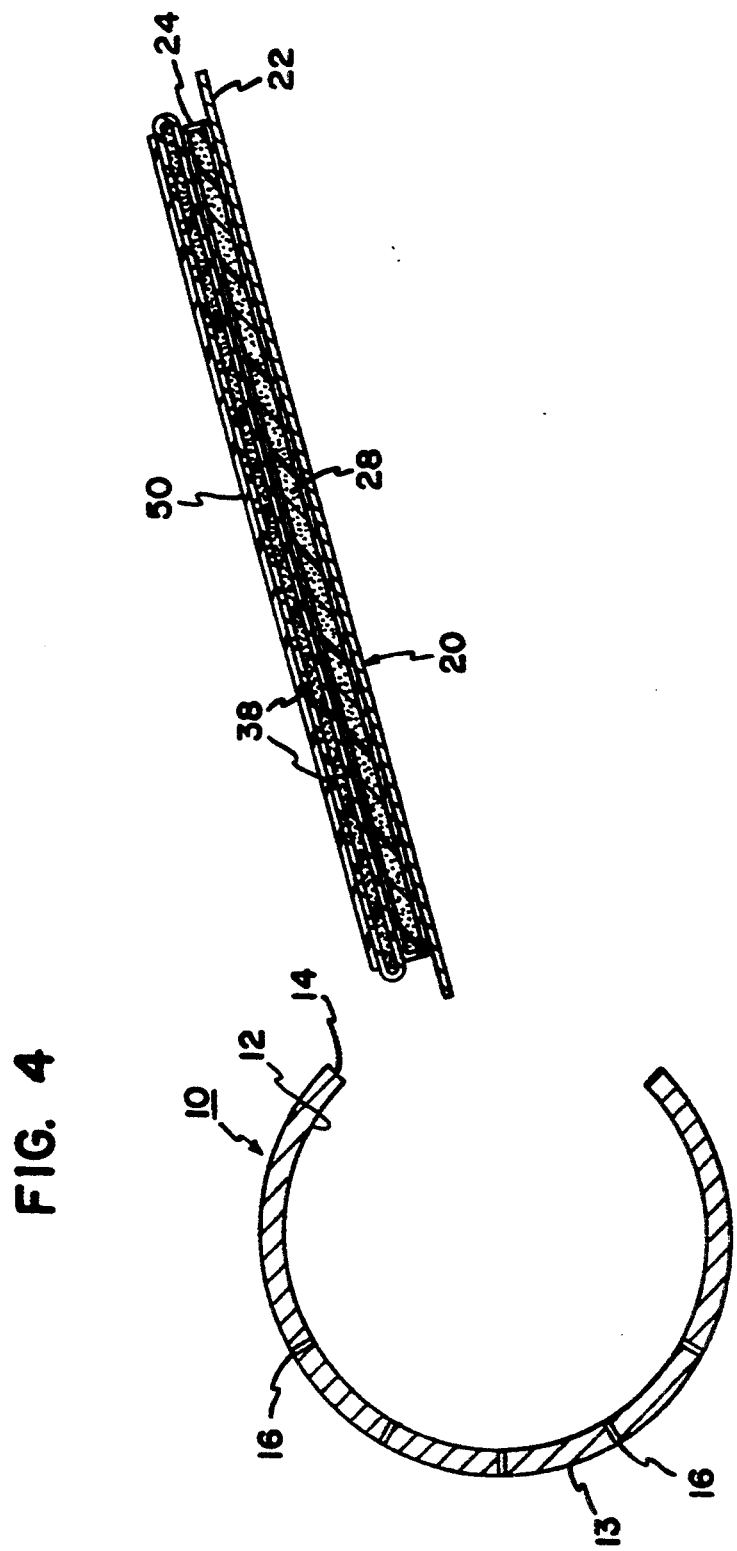
FIG. 4 is the view of FIG. 3 showing the carrier upper layer collapsed prior to admission to the drum.
Figure 5:
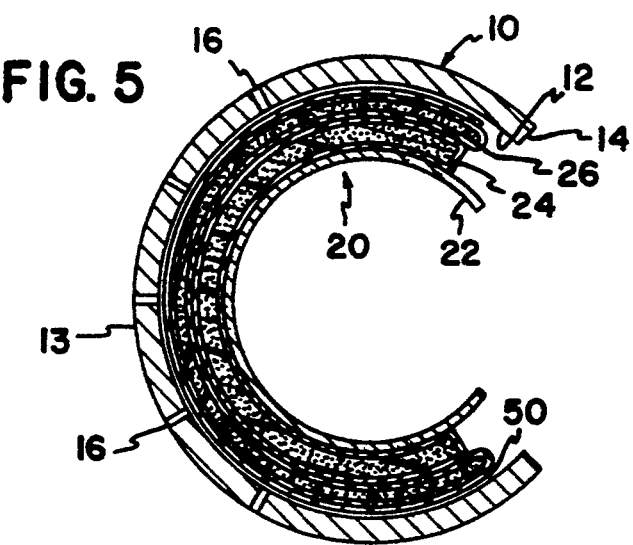
FIG. 5 shows the placement of the carrier of FIG. 4 within the drum.

With sheet 50 adhered to carrier 20 and with top bladder 26 collapsed in thickness (as shown in FIG. 4), the carrier 20 is positioned within the drum with the sheet 50 closely spaced from surface 12 of drum 10. The flexible backing 22 and flexible nature of material of carrier 20 permits the carrier 20 to bend to approximate the shape of surface 12 of drum 10. In a preferred embodiment, the sheet 50 and top surface of upper bladder 26 will be spaced evenly from inner surface 12 throughout the entire surface area of inner surface 12 (see FIG. 5). The carrier 20 is positioned within drum 10 such that when either bladder 24, 26 is compressed in response to a vacuum on tubes 40, 42, the upper surface 36 of upper bladder 26 is spaced from interior surface 12. Further, the positioning of carrier 20 is selected so that top surface 36 of upper bladder 26 abuts surface 12 when both tubes 40, 42 are vented and bladders 24, 26 are urged by the resilience of foam sheets 28, 30 toward their full thickness.

While dimensions may vary, for use with so-called A-3 sheets of film, the drum 10 has an internal radius of about 4 inches. The bladders 24, 26 are sized such that the difference between thickness of the carrier 20 between the full rest state of each bladder and the collapsed state of either bladder 24, 26 is about one-eighth inch. The backing sheet 22 is about one-sixteenth inch thick.

Figure 6:
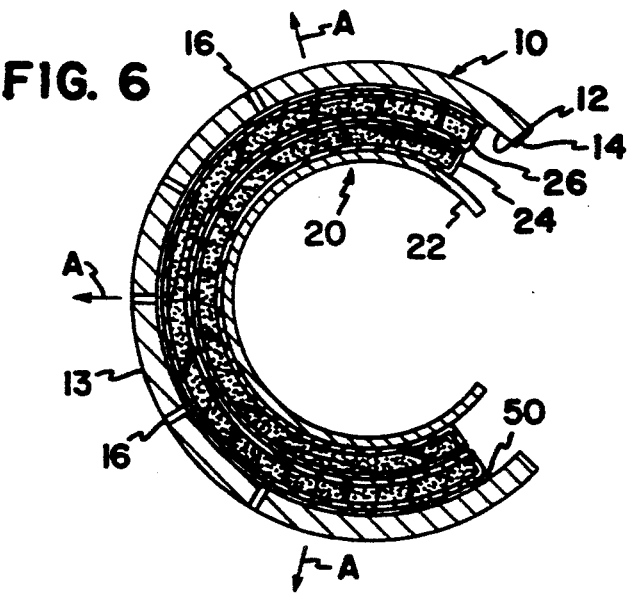
FIG. 6 shows the view of FIG. 5 with the carrier expanded to urge the film against an interior surface of the drum.

Following positioning of the carrier 20 within the drum 10, the vacuum applied to bladder 26 is relieved and the bladder 26, due to the natural resilience of foam sheet 30, expands to its full thickness thereby urging sheet 50 against surface 12 (FIG. 6). With sheet 50 urged against surface 12, the vacuum (indicated by arrows A) can be applied to the external surface 13 of the drum 10 causing the sheet 50 to be adhered to the surface 12. The vent of tube 42 so relieves the adherence of film 50 to the top surface 36 of upper bladder 26.

Figure 7:
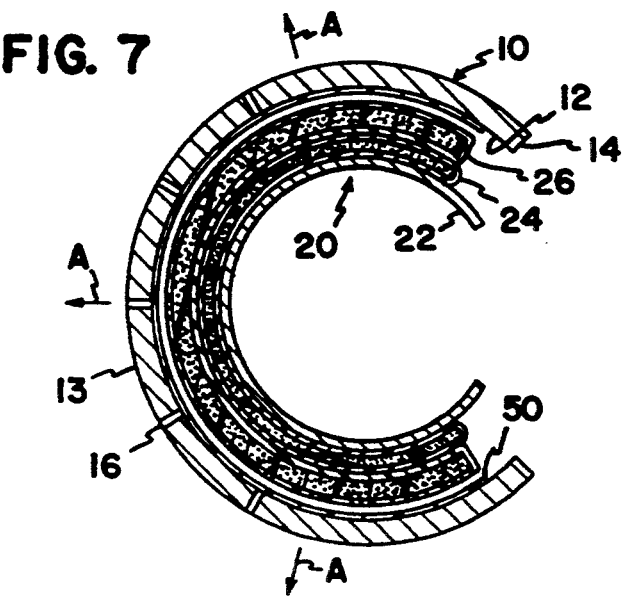
FIG. 7 is the view of FIG. 6 showing the carrier collapsed and spaced from the drum while leaving the film adhered to the internal surface of the drum.
Figure 8:
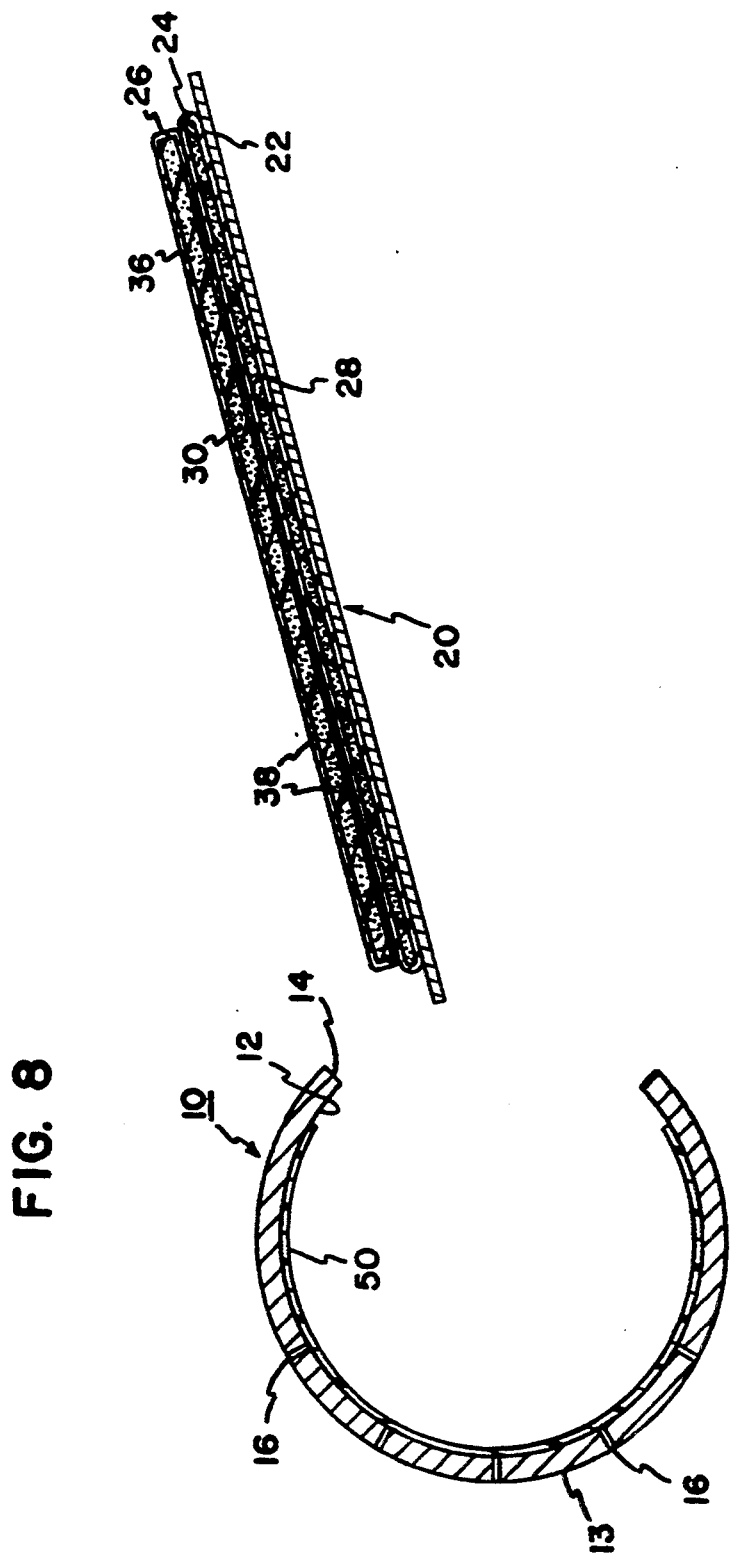
FIG. 8 is the view of FIG. 7 with the carrier removed from the drum.

After adherence of sheet 50 to surface 12, a vacuum is then applied to tube 40 causing lower bladder 24 to collapse in thickness. As lower bladder 24 collapses in thickness, the upper surface 36 of upper bladder 26 becomes spaced from film 50 which is retained in residence against surface 12 by means of the vacuum (A) being applied to the exterior surface 13 of drum 10 (FIG. 7). Accordingly, the carrier 20 can then be removed from the drum without interference with the sheet 50 held in residence against surface 12 (FIG. 8). Once carrier 20 is removed from drum 10, tube 40 may be vented causing lower bladder 24 to assume its rest thickness (FIG. 9).

When it is desired to remove the sheet 50 from surface 12, the process may be reversed. Namely, lower bladder 24 may be collapsed by applying a vacuum to tube 40 and the collapsed thickness carrier 20 is placed within the drum with the top surface 36 of upper bladder 26 opposing and spaced from the sheet 50. The vacuum to tube 40 is released causing the lower bladder 24 to expand and with upper surface 36 of upper bladder 26 abutting the film 50. A vacuum is then applied to tube 42 causing the sheet 50 to releasably adhere to the upper surface 36 by means of the vacuum drawn through perforations 38. This vacuum also reduces the thickness of upper bladder 26 causing upper surface 36 of upper bladder 26 and attached sheet 50 to move away from drum inner surface 12.

In order to remove the sheet 50 from surface 12, the vacuum to external surface 13 of the drum can be relieved. Alternatively, the vacuum applied to the perforations 38 may simply be greater than the vacuum applied to the perforations 16 of the drum 10 to cause the sheet 50 to release from the inner surface 12 and attach to surface 36.

Figure 9:
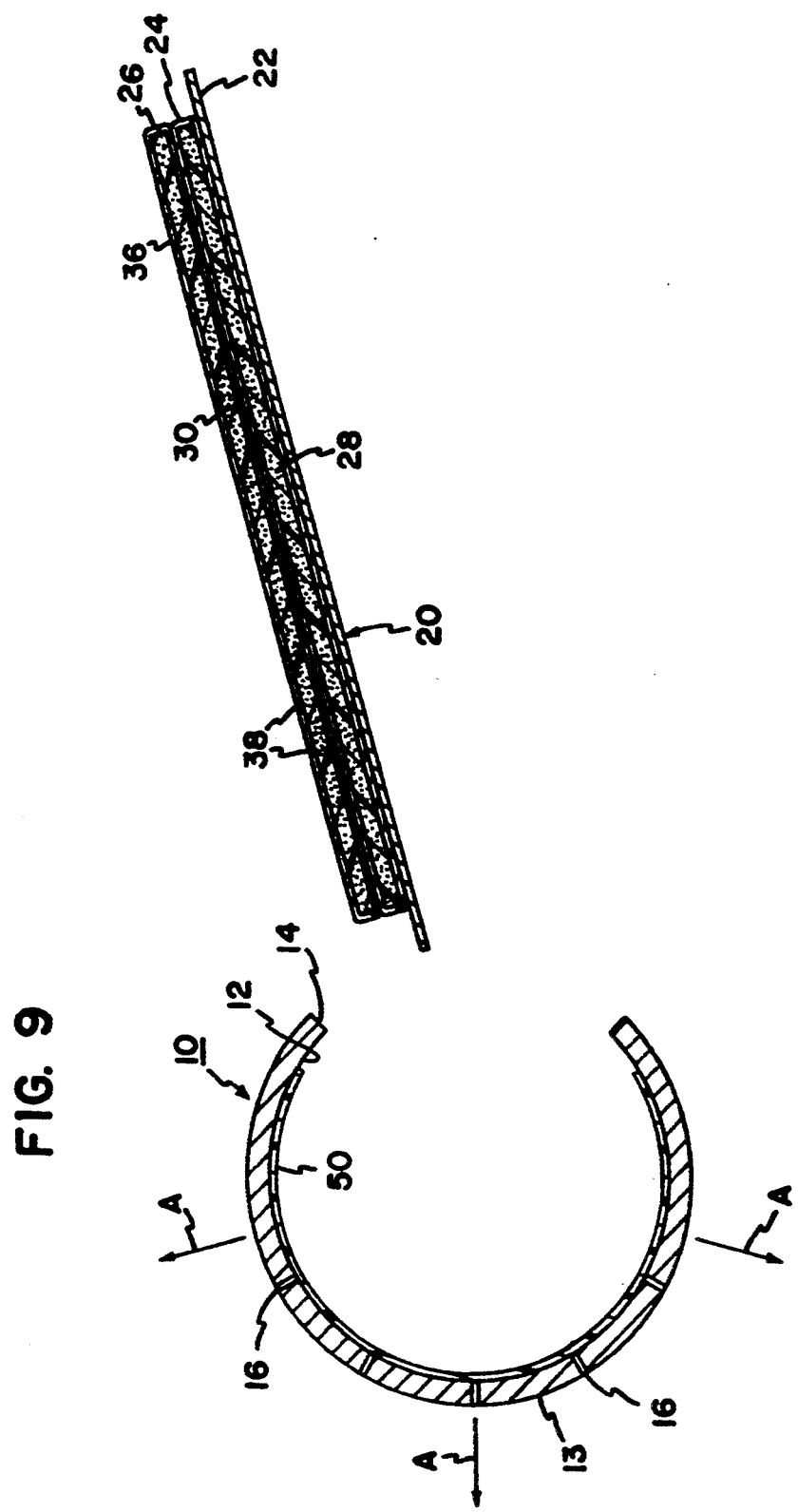
FIG. 9 is the view of FIG. 8 with the carrier expanded to its rest thickness.

In addition to placing and removing a sheet 50 of film to the drum surface 12, once the sheet 50 is placed within the drum (as shown in FIG. 9) a second sheet of thin film (such as a donor sheet as is known in the art) may be placed in overlying relation to the sheet 50 simply by placing the donor sheet on the carrier 20 and inserting the carrier 20 and the donor sheet in the manner identical to that illustrated in FIGS. 2 through 9 and discussed above.

With the foregoing apparatus and method, flimsy thin film can be placed against the internal surface 12 of a drum 10 while avoiding wrinkles or scratching of the film. The vacuum adherence of the sheet 50 to the upper surface 36 of the carrier 20 maintains the sheet 50 in a wrinkle-free state on the carrier 20 as it is placed against the surface 12 of the drum 10.

An alternative embodiment of the present invention is shown in FIGS. 10–15. In FIGS. 10–15, the carrier 20' includes a backing layer 22' consisting of a plurality of discrete inverted "U"-shaped support bars 122. The bars 122 extend in spaced side-by-side parallel alignment with the longitudinal dimension of the bars 122 being generally parallel to the cylindrical axis of the drum 10.

A first or bottom bladder layer 24' of the carrier 20' consists of a plurality of discrete bladders 124 with each of bladders 124 uniquely coupled to an upper surface of each of the backing units 122. A second or upper bladder layer 26' of the embodiment of carrier 20' also consists of a plurality of individual bladders 126, each of which is secured to an upper surface of an individual one of the first bladders 124.

Each of bladders 124, 126 may be similar in construction to bladders 20, 26. Namely, each of bladders 124, 126 may be open-cell foam surrounded by air impervious envelopes with the upper surfaces of the envelope of bladders 126 being perforated. For the purpose of illustrating an alternative embodiment, bladders 124, 126 are shown as flexible tubes (which may be circular, rectangular or any other geometry in cross section).

Attached to the upper surfaces of each of the individual bladders 126 is a carrier sheet or substrate 55 having perforations 138. The perforations 138 of the carrier substrate are in air-flow alignment with perforations (not shown) formed through the upper surfaces of upper bladders 126. The carrier substrate 55 is a semi-rigid material (for example, aluminum of 5 to 10 mils thickness) that will offer a planar surface for the support of film 50 loaded in the manner previously described. Carrier substrate 55 is flexible so as to assume a generally cylindrical shape. Accordingly, carrier substrate 55 can oppose the internal surface 12 and substantially cover the surface 12 of drum 10. In a rest state, carrier substrate 55 is flat.

Figure 12:
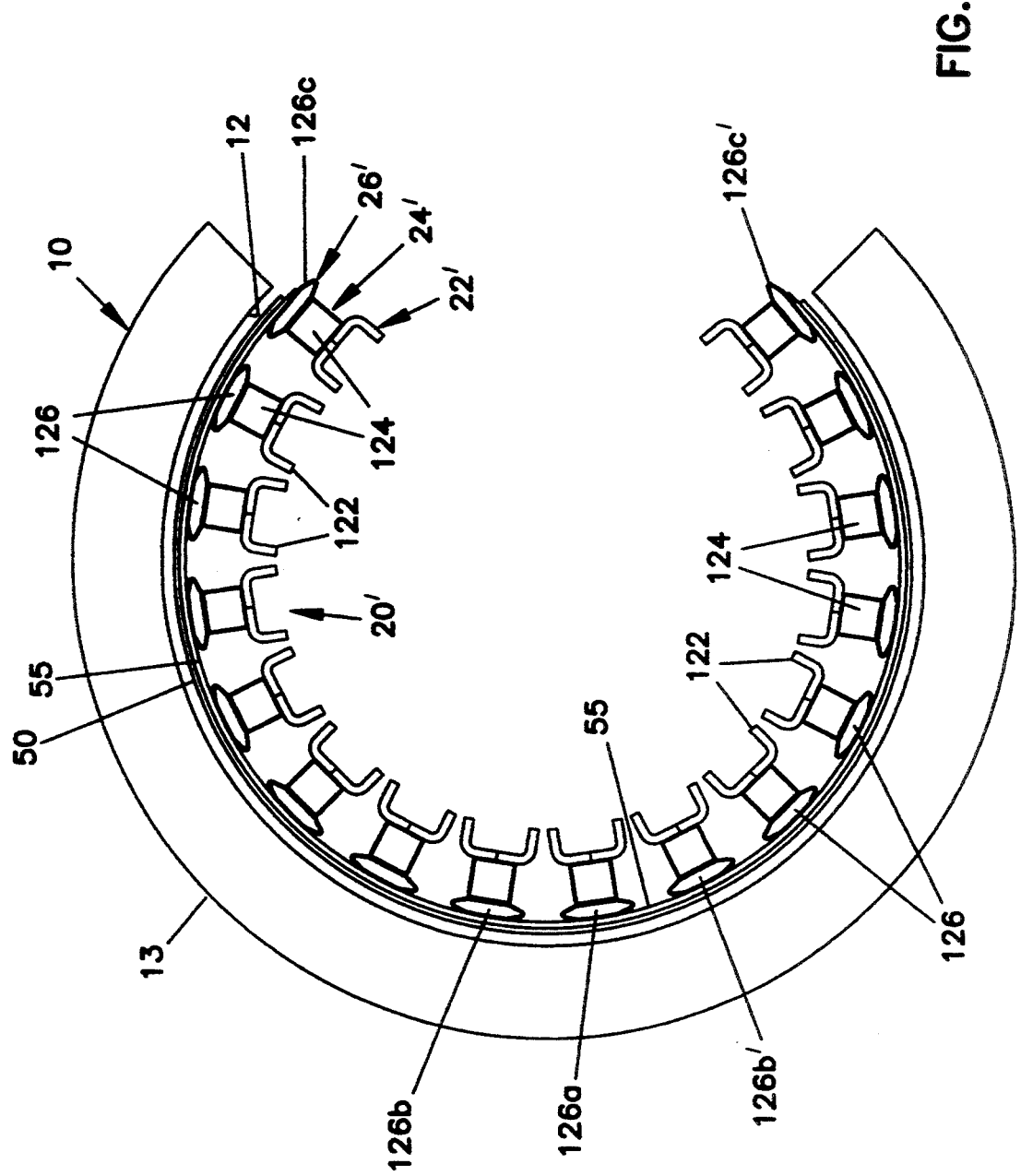
FIG. 12 is a side elevation view of the carrier of FIGS. 10 and 11 received within a drum and with an upper layer of the carrier in a collapsed state and carrying a thin film to be placed against an internal surface of the drum.

The upper bladders 126 are covered by carrier substrate 55 with perforations 138. Accordingly, when a sheet of film 50 is placed across carrier substrate 55, a vacuum can be applied to the interior of the upper bladders 126 causing the sheet 50 to adhere to the carrier substrate 55 by means of vacuum adhesion and with the bladders 126 collapsing in thickness (FIG. 12 showing collapsed bladders 126). Also, application of a vacuum to the bladders 124 causes reduction in the thickness of the bladders 124 similar to the reduction in thickness of bladders 126.

Each of the bladders 126 is provided with an individual tube 142 for purpose of applying a vacuum to the bladders 126. Similarly, each of the bladders 124 is provided with a tube 140 for applying a vacuum to the tubes 140 and the interior of bladders 124. For the purposes of clarity of illustration, only selected ones of tubes 142, 140 are shown in FIGS. 10 and 11, only.

FIG. 12 shows the carrier 20' in position within the drum 10 and carrying a sheet 50 of film positioned on carrier substrate 55. Bladders 126 are subjected to a vacuum and, accordingly, are collapsed resulting in the sheet 50 being evenly spaced from surface 12 throughout the surface area of the sheet 50.

Upon relief of the vacuum, the bladders 126, due to the natural resilience of the tubing of bladders 126, are urged to their rest state with the sheet 50 urged against surface 12 and held against surface 12 by means of a vacuum applied to exterior surface 13. In order to then remove the carrier 20' from the interior of the drum 10, a vacuum is applied to the interior of each of bladders 124 causing the bladders 124 to collapse in thickness and drawing the carrier substrate 55 away from the film 50. Accordingly, the carrier 20' may be inserted or removed from the drum 10 in the same manner as carrier 20. Namely, the upper bladder layer 26' is subjected to a vacuum in order to adhere the sheet 50 to the carrier 20' and insert the carrier 20' within the drum 10 while maintaining the sheet 50 in spaced relation from the internal surface 12 of the drum 10. The upper bladder layer 26' is relieved of the vacuum with the natural resilience of the upper bladder layer 26' urging the sheet 50 against the inner surface 12 and with the sheet 50 held in residence against surface 12 by means of a vacuum applied to the drum 10. The lower bladder layer 24' is subjected to a vacuum in order to collapse the lower bladder layer 24' resulting in spacing of the carrier 20' from the sheet 50 and permitting the carrier 20' to be removed from the drum 10 without interference with the sheet 50.

Figure 10:
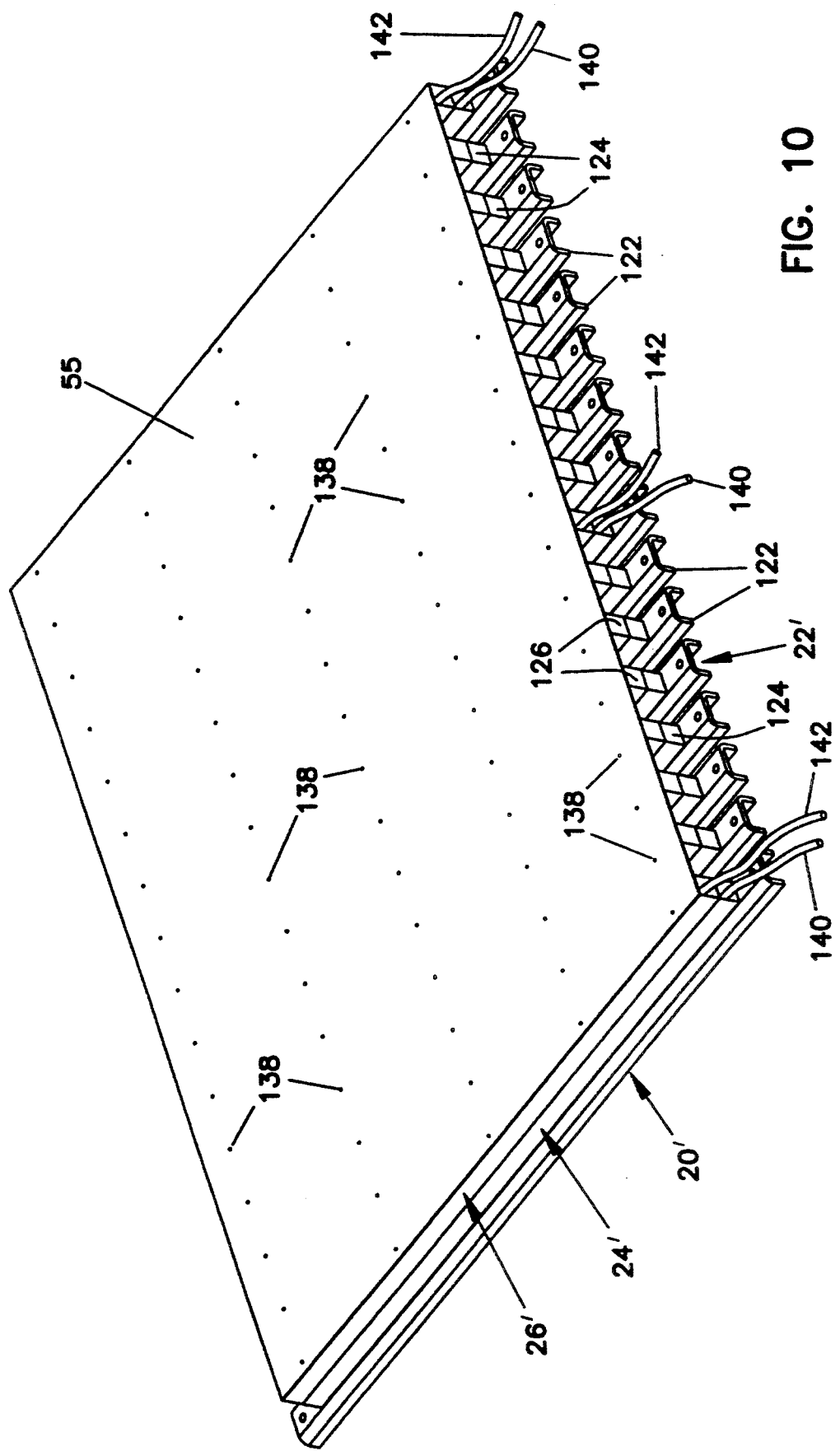
FIG. 10 is a perspective view of an alternative embodiment of a carrier according to the present invention.
Figure 11:
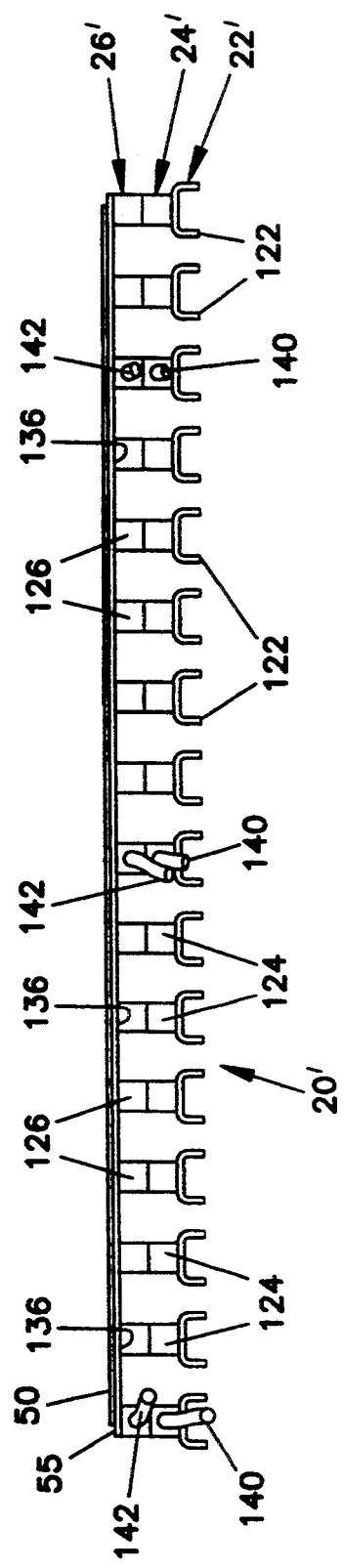
FIG. 11 is a side elevation view of the carrier of FIG. 10.

The embodiment of FIGS. 10–12 provides additional advantages over that of FIGS. 1–9. Namely, by dividing the bladders 24', 26' into a plurality of individual bladder units 124, 126, the carrier 20' is less susceptible to warping or wrinkling as it is being flexed in a generally cylindrical shape thereby reducing the possibility of warping of the film 50. Furthermore, each of the upper bladders 126 and associated lower bladders 124 constitutes a discrete zone. Namely, with the apparatus in place as shown in FIG. 12, the centrally positioned bladder 126a may first be relieved of its vacuum causing the sheet 50 to be urged against the wall 12 at the location of bladder 126a.

Subsequently, the next adjacent bladders 126b and 126b' may be relieved of their vacuum causing these bladders 126b, 126b' to urge the sheet 50 against the drum surface 12 at these locations. This sequence of relieving the vacuum on the bladders 126 may be progressively performed from the inner bladder 126a to the outer bladders 126c, 126c'. By progressively urging the film against wall 12 from the center of the film 50 out to its ends, any wrinkles which might otherwise occur on the film 50 are smoothed out as the film 50 is being adhered to the wall 12. To accomplish this sequential expansion of bladders 126, tubes 142 may each be provided with a valve (not shown) to selectively relieve a vacuum as to each bladder 126.

Figure 13:
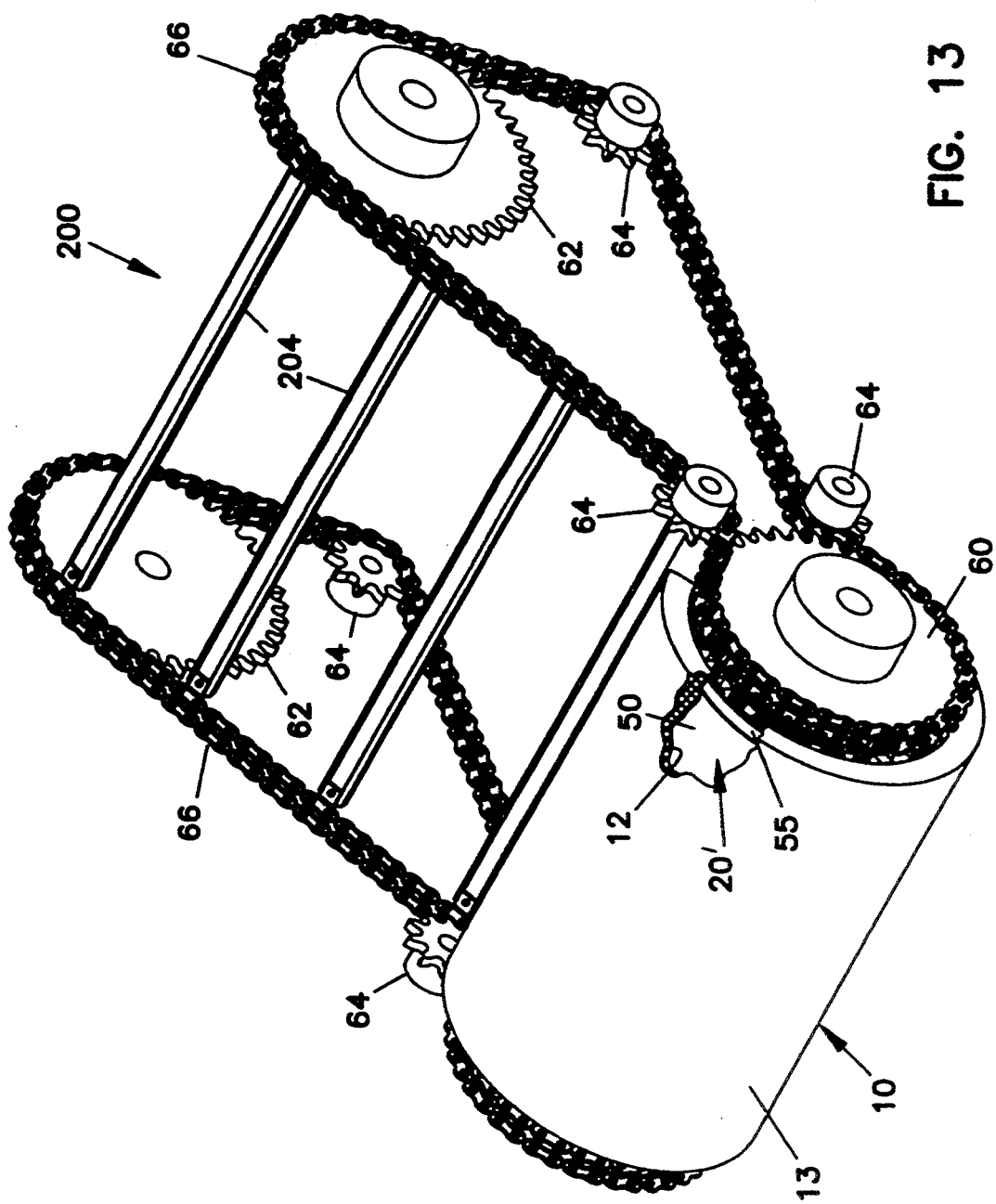
FIG. 13 is a perspective view of an apparatus according to the present invention for positioning of the carrier of FIGS. 10 and 11 within a drum.
Figure 14:
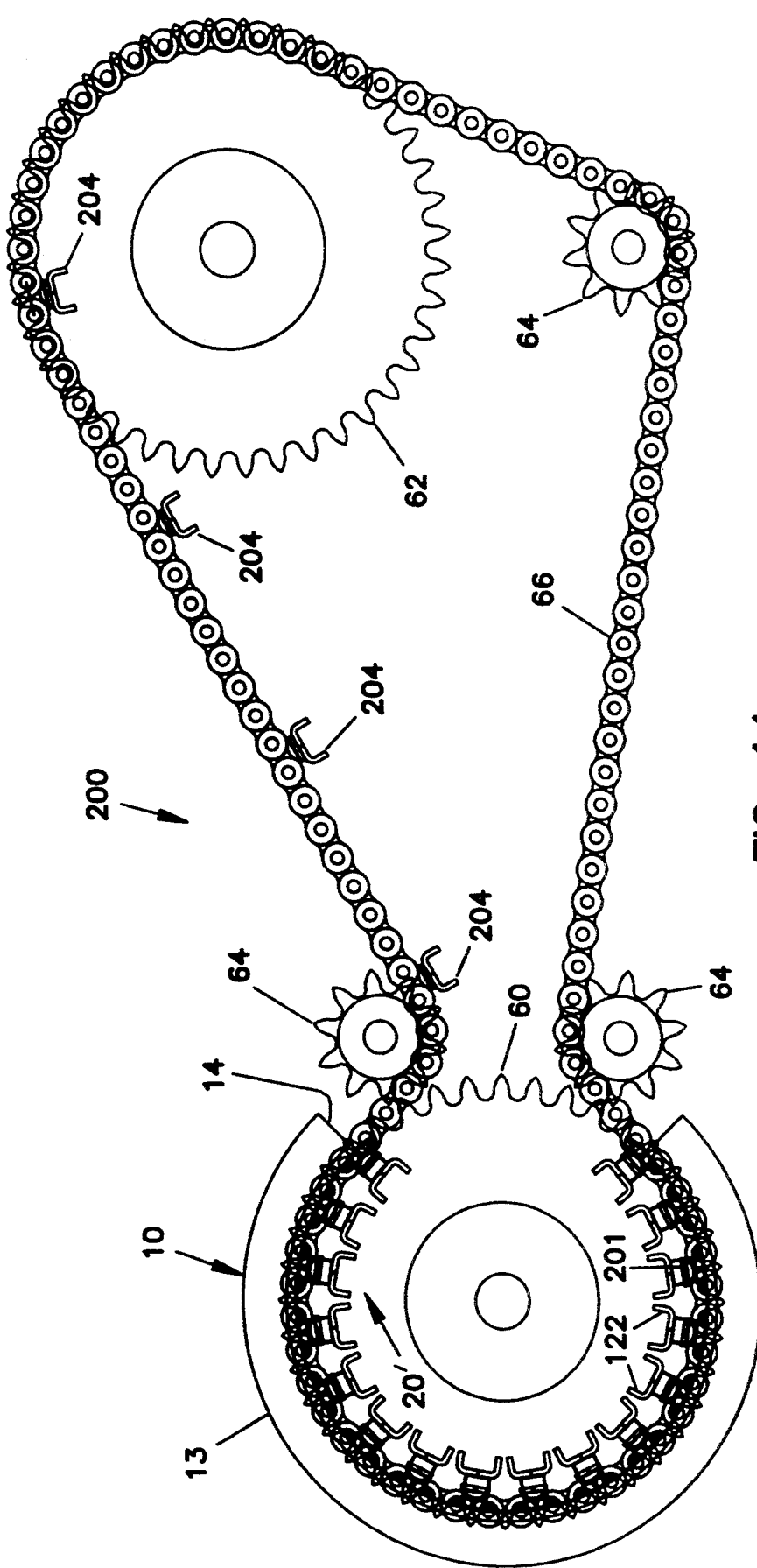
FIG. 14 is a side elevation view of the apparatus of FIG. 13.
Figure 15:
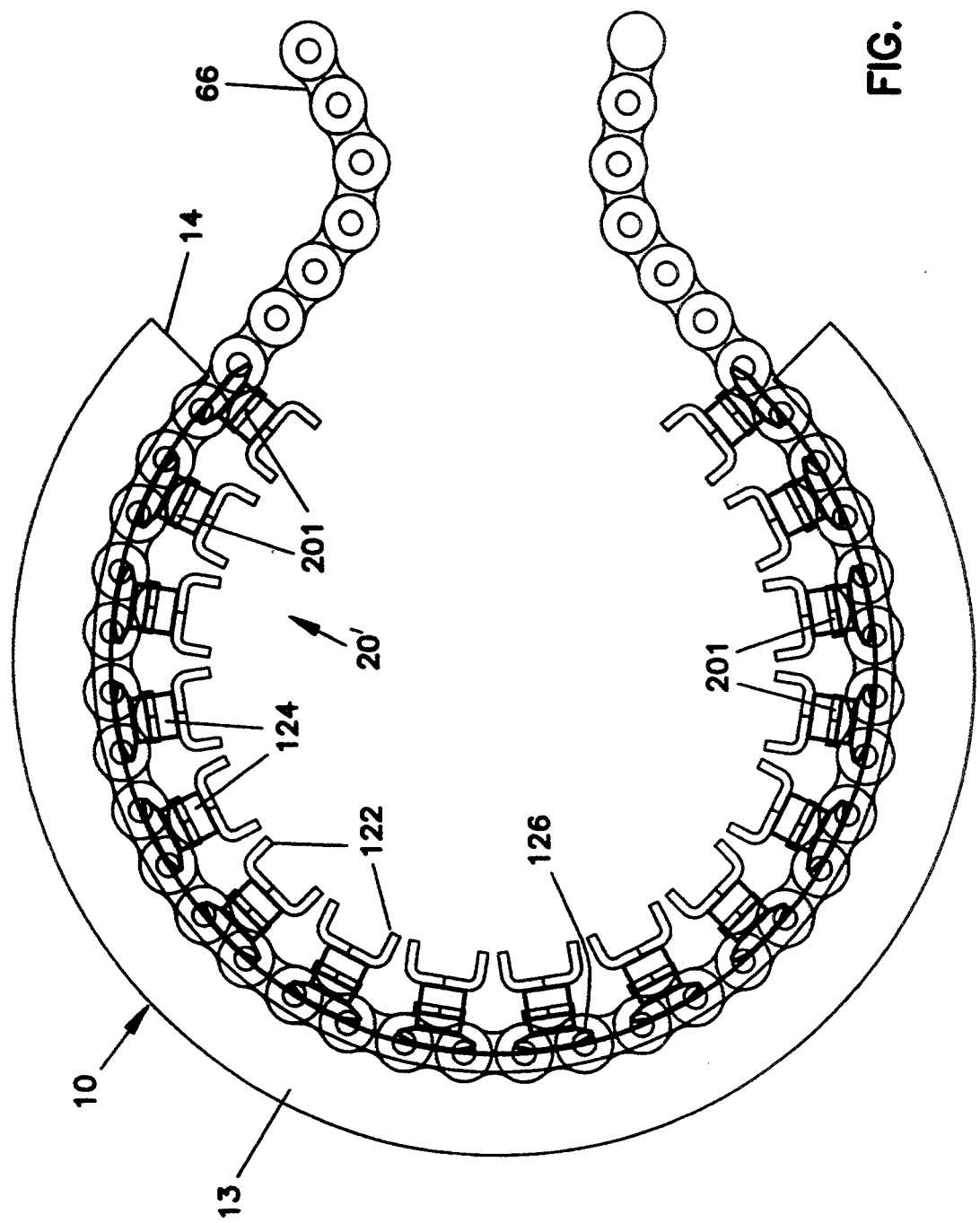
FIG. 15 is an enlarged view of a portion of the view of FIG. 14.

FIGS. 13–15 show an apparatus 200 for placement of the carrier 20' within the interior of the drum. The apparatus 200 includes a first pair of idler sprockets 60 positioned exterior of the drum 10 and on opposite axial ends of the drum 10. Driven sprockets 62 are positioned with the sprockets 62 in axial alignment with one another and with the sprockets 62 aligned in coplanar alignment with sprockets 60. Additional idler sprockets 64 are provided for tensioning and guiding a chain 66 entrained around sprockets 60, 62.

In FIG. 13, supports 204 are shown extending between chains 66. Supports 204 may serve to hold tubes 140, 142 to prevent entanglement of tubes 140, 142 with chains 66.

In FIGS. 14 and 15, support bars 122 are secured to the chain 66 by means of spacers secured to flats 201 formed on the chain 66. Accordingly, the carrier 20' is carried on the chain 66 into and out of the drum through the access opening 14. The chain 66 is positioned (and sprockets 60 are sized) such that the center line of the chain 66 is coincident with the top surface of carrier substrate 55 when a vacuum is applied to either of bladders 126, 124. Accordingly, the film 50 is not being stretched as it is being placed into or removed from the drum 10.

Figure 16:
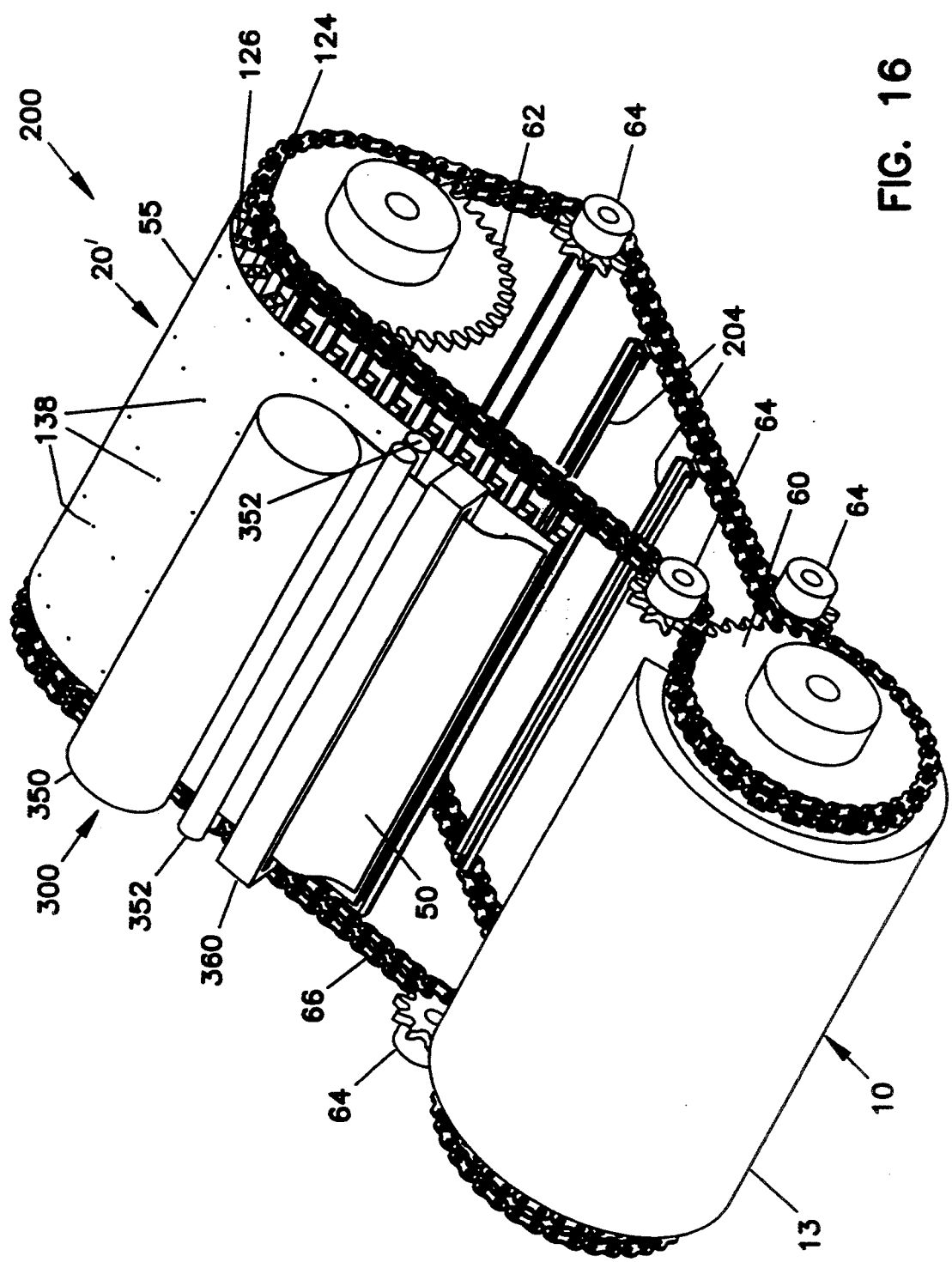
FIG. 16 is a perspective view of an apparatus of FIG. 13 with the addition of a film-loading device.

FIG. 16 is similar to FIG. 13. In addition, FIG. 16 shows a loading device 300 for loading a sheet 50 of film from a roll 350. As the carrier 20' is advanced, rollers 352 advance the sheet 50 through a cutting head 360. The sheet 50 is placed over the carrier substrate 55. Vacuum applied to upper bladders 126 (as previously described) adheres the sheet 50 to the carrier substrate 55. When the carrier substrate 55 is covered with the sheet 50, the cutting head 360 cuts the sheet 50 from the roll 350.

From the foregoing, Applicants have shown how the use of a carrier 20, 20' permits placement of a flexible thin film 50 against the interior surface 12 of an imaging drum 10. The carrier 20, 20' permits the film 50 to be placed without wrinkles on the film.

With the invention thus described, multiple layers of thin film can be placed against the interior surface 12 of the drum 10. For instance, when loading films for use in image transfer, a first sheet of film can be loaded into the drum 10. Using a semi-air permeable first sheet, the first sheet can be vacuum adhered to the internal surface 12 of the drum 10 as previously discussed. Due to the semi-air permeability of the first sheet, air passes through the first sheet. A second sheet can be placed in overlying relation to the first sheet by using the carrier 20, 20' as discussed above. The second sheet is adhered in overlying relation to the first sheet by means of the vacuum applied through the semi-air permeable first sheet.

As an alternative to the above, the perforations 16 of the drum 10 may be segregated into at least two zones. A first or inner zone of the perforations 16 covers a surface area of a first sheet of film to be applied to the interior surface 12. A second or peripheral zone of the perforations 16 surrounds the periphery of the first zone such that the second zone of perforations 16 are exposed to the interior of the drum 10 after a first sheet is applied to the interior surface 12.

With the structure thus described, a first sheet can be placed against the interior surface 12 of the drum 10 and held in place by means of vacuum applied through the first zone of perforations 16. A second sheet having a larger surface area and dimensions than the first sheet can be placed in overlying relation to the first sheet. Since the second sheet is larger than the first sheet, an outer peripheral area of the second sheet is disposed directly opposing the perforations 16 of the second zone. Accordingly, a vacuum applied to the perforations 16 of the second zone will hold the second sheet against the interior surface 12 of the drum 10. Also, the second zone can assist in removing the second sheet by means of pressurizing the perforations 16 of the second zone such that the second sheet is blown off of the interior surface 12 of the drum while retaining the first sheet adhered by reason of a vacuum continued to be applied to the perforations 16 of the first zone.

The use of the present apparatus to load multiple layers of sheets of film onto the interior surface 12 of a drum 10 is desirable in an image transferring process. Specifically, a receptor sheet of film is loaded into the interior surface of the drum 10 as described. A first donor sheet of film (such as a yellow sheet) is loaded in overlying relation to the receptor sheet using the loading apparatus and method previously described. The imaging equipment of the apparatus then images from the first donor sheet to the receptor. The first donor sheet is then removed using carrier 20, 20' in the manner previously described. This leaves the receptor sheet in place. A second donor sheet of color (for example, cyan) is loaded in overlying relation to the receptor sheet. The imaging process is repeated. After the imaging process, the second donor sheet is removed using the carrier 20, 20' and a third donor sheet of a color (for example, magenta) is loaded and later removed following imaging. Finally, a black donor sheet is placed in overlying relation to the receptor sheet. Following imaging, the black donor sheet is removed and, finally, the receptor sheet is removed.

Previously, multiple layers of sheets required a hand apparatus or automated apparatus for a flat imaging surface or on the external surface of a drum. However, prior to the teachings of the present invention, multiple layers were not attainable with the film placed against the interior surface of an imaging drum.

While the invention has been shown in a preferred embodiment, it will be appreciated that with the benefits of the teaching of the present invention, additional embodiments may occur to one skilled in the art. Accordingly, it is intended that the present invention not be limited to the preferred embodiment, but shall include such modifications and equivalents as which readily occur to one skilled in the art.

What is claimed is:

1. A method for loading a thin flexible film onto an interior surface of a hollow image-processing drum having an access opening, said method comprising:
    placing a sheet of said film on a first surface of a carrier having means for releasably adhering said film to said first surface;
    releasing adherence of said sheet from said first surface;
    admitting said carrier and said releasably adhered sheet into said drum through said opening and positioning said carrier within said drum with said sheet opposing and spaced from said interior surface;
    urging said first surface toward said interior surface with said sheet placed in residence against said interior surface;
    releasing adherence of said sheet from said first surface and releasably adhering said sheet onto said interior surface; and
    removing said carrier from said drum while leaving said film releasably adhered to said interior surface.

2. A method according to claim 1 comprising moving said first surface away from said sheet after adhering said sheet to said interior surface and before removing said carrier from said drum.

3. A method according to claim 1 wherein said means for releasably adhering said film to said first surface includes means for applying a vacuum to said first surface, said steps of releasably adhering said sheet to said first surface and releasing adherence of said sheet to said first surface including applying and disengaging, respectively, a vacuum at said first surface.

4. A method according to claim 1 wherein said carrier includes a compressible layer with said first surface secured to said compressible layer for movement therewith; said urging of said first surface toward said interior surface including expanding said compressible layer.

5. A method according to claim 2 wherein said carrier includes a compressible layer with said first surface secured to said compressible layer for movement therewith, said moving of said first surface away from said interior surface including compressing said compressible layer.

6. A method according to claim 1 wherein said carrier is admitted into said drum with said sheet evenly spaced from said interior surface throughout a surface area of said sheet.

7. A method according to claim 1 further comprising:
    readmitting said carrier into said drum with said first surface spaced from said sheet adhered to said drum;
    urging said first surface against said sheet;
    releasably adhering said sheet to said carrier;
    removing said carrier and said sheet from said drum.

8. A method according to claim 7 wherein said carrier includes a compressible layer with said first surface secured to said compressible layer for movement therewith, said urging of said first surface toward said interior surface including expanding said compressible layer.

9. A method according to claim 1 wherein said first surface includes a plurality of discrete zones each separately movable toward said interior surface, said urging of said surface including separately urging each of said zones toward said interior surface.

10. A method according to claim 9 comprising sequentially urging each of said zones by first urging zones disposed opposite a center of said sheet and progressively urging adjacent zones.

11. A method according to claim 1 wherein said first surface is movable within said drum toward said interior surface in a radial direction and over a predetermined stroke of travel, said positioning including placing said carrier within said drum with said first surface spaced from said interior surface by a distance not greater than said stroke of travel.

12. An apparatus for loading a thin flexible film into an interior surface of a hollow image-processing drum having an access opening, said apparatus comprising:
    a flexible carrier having a first surface with means for releasably adhering a sheet of said film to said first surface;
    means for admitting said carrier into said drum through said access opening with said carrier flexed for said first surface to oppose said interior surface;
    means for urging said first surface toward said interior surface; and
    means for releasably adhering said film to said interior surface.

13. An apparatus according to claim 12 wherein said carrier includes a support layer for placement within said drum in fixed relative position to said interior surface and said first surface is movable toward and away from said support layer.

14. An apparatus according to claim 13 wherein said support layer is a flexible backing sheet.

15. An apparatus according to claim 13 wherein in said support layer is a plurality of rigid supports held in side-by-side alignment with said first surface secured to said plurality of rigid supports.

16. An apparatus according to claim 13 comprising at least a collapsible layer secured to said support layer with said collapsible layer selectively movable from a first thickness to a second thickness.

17. An apparatus according to claim 16 wherein said collapsible layer includes at least two bladder layers including a lower bladder layer secured to said support layer and an upper bladder layer secured to said lower bladder layer, each of said upper and lower bladder layers individually adjustable between first and second thicknesses and with an upper surface of said upper bladder layer having means for releasably adhering said sheet to said upper surface, said upper surface comprising said first surface.

18. An apparatus according to claim 17 wherein each of said bladder layers includes means for applying a vacuum to an interior of said bladder layers and reducing a thickness of said bladder layers in response to said vacuum.

19. An apparatus according to claim 17 wherein said means for adhering said sheet to said upper surface includes vacuum means for vacuum adhesion of said sheet to said upper surface.

20. An apparatus according to claim 13 wherein said first surface is movable toward and away from said support layer by a predetermined stroke, said means for admitting including means to space said first surface from said interior surface by a distance not greater than said stroke.

21. A method for loading film onto an interior surface of a generally cylindrical image processing drum, said method comprising:

placing a sheet of receptor film on a carrier;
transporting said carrier into an interior of a hollow image transfer drum;
transferring said sheet of receptor film from said carrier to an interior surface of said drum;
removing said carrier;
placing a sheet of a first donor film on a carrier;
transferring said carrier and said first donor film into said interior of said drum; and
transferring said first donor film from said carrier onto said interior surface with said donor film disposed in overlying relation on said sheet of said receptor film.

22. A method according to claim 21 wherein said receptor film is releasably adhered onto said interior surface by means of a vacuum, said donor film is releasably adhered to said drum by means of a vacuum.

23. A method according to claim 22 wherein said receptor film is semi-air permeable, said method including releasably adhering said receptor film to said interior surface by means of a vacuum with said vacuum applied through said semi-air permeable receptor film and releasably adhering said first donor film to said receptor film.

24. A method according to claim 22 wherein said vacuum is applied across said interior surface of said drum over a surface area greater than a surface area of said receptor film for said receptor film to cover a first portion of said surface and with a second portion exposed opposing said first donor film.

* * * * *